United States Patent
Rizos

(10) Patent No.: US 11,994,436 B2
(45) Date of Patent: May 28, 2024

(54) NON-CONTACT METHODS OF RAIL ASSESSMENT FOR A RAILROAD TRACK

(71) Applicant: UNIVERSITY OF SOUTH CAROLINA, Columbia, SC (US)

(72) Inventor: Dimitrios Rizos, Columbia, SC (US)

(73) Assignee: UNIVERSITY OF SOUTH CAROLINA, Columbia, SC (US)

(*) Notice: Subject to any disclaimer, the term of this patent is extended or adjusted under 35 U.S.C. 154(b) by 511 days.

(21) Appl. No.: 17/051,225

(22) PCT Filed: Apr. 8, 2019

(86) PCT No.: PCT/US2019/026267
§ 371 (c)(1),
(2) Date: Oct. 28, 2020

(87) PCT Pub. No.: WO2019/212693
PCT Pub. Date: Nov. 7, 2019

(65) Prior Publication Data
US 2021/0131888 A1 May 6, 2021

Related U.S. Application Data

(60) Provisional application No. 62/664,520, filed on Apr. 30, 2018.

(51) Int. Cl.
*G01L 1/24* (2006.01)
*B61L 23/04* (2006.01)
*G01M 5/00* (2006.01)

(52) U.S. Cl.
CPC ............ *G01L 1/24* (2013.01); *B61L 23/045* (2013.01); *G01M 5/0025* (2013.01)

(58) Field of Classification Search
CPC ...... G01N 29/265; G01N 29/11; G01N 29/12; G01N 29/50; G01N 21/1702; G01N 3/48;
(Continued)

(56) References Cited

U.S. PATENT DOCUMENTS 5,161,891 A 11/1992 Austill
5,992,241 A 11/1999 Posgay et al.
(Continued)

FOREIGN PATENT DOCUMENTS

EP 3168585 5/2017
KR 20090129674 12/2009

OTHER PUBLICATIONS

Abdulqader, et al. "Advantages of Using of Digital Image Correlation in Uniaxial Compression Tests" *Results Eng.* 6:100109 (2020) pp. 1-5.
(Continued)

*Primary Examiner* — Brandi N Hopkins
(74) *Attorney, Agent, or Firm* — DORITY & MANNING, P.A.

(57) ABSTRACT

Methods of non-destructive rail analysis and evaluation for railroad tracks are provided. The methods can include capturing images of rails over time and at various temperatures. High-contrast patterns can be applied to or associated with a rail to facilitate image analysis. Rail neutral temperature (RNT), stress, strain, and curvature of the track can be determined using image correlation and regression analysis. A stereovision system may be used for rail neutral temperature measurements and for determining effects of a heating method. A non-contacting, nondestructive methodology for RNT and longitudinal rail stress measurements is based on stereo vision image acquisition and Digital Image Correlation (DIC) for acquiring the full field shape, deformation, and strain measurements taken during a thermal cycle. The thermal cycle can be natural or induced.

26 Claims, 9 Drawing Sheets

(58) Field of Classification Search
CPC ...... G01N 29/04; G01N 29/043; G01L 1/255;
G01L 1/24; G01L 1/2256; B61L 23/041;
B61L 15/0081; B61L 23/047; B61L
23/045; B61L 23/042; B61L 25/021;
G01D 21/02; E21F 17/18; G01K 7/36;
G06F 30/367; G01M 5/0058; G01M
5/0033; B61K 9/08; E01B 35/12

See application file for complete search history.

(56) References Cited

U.S. PATENT DOCUMENTS

| | | | |
|---|---|---|---|
| 9,752,993 B1* | 9/2017 | Thompson | G01M 5/0066 |
| 2012/0245908 A1 | 9/2012 | Berggren | |
| 2013/0070083 A1* | 3/2013 | Snead | B61L 23/045 348/125 |
| 2014/0044146 A1* | 2/2014 | Harrison | G01N 25/72 374/4 |
| 2014/0152814 A1 | 6/2014 | Farritor | |
| 2014/0312133 A1 | 10/2014 | Langenbeck | |
| 2014/0316719 A1* | 10/2014 | Lanza di Scalea | G01M 5/0066 702/42 |
| 2015/0377836 A1 | 12/2015 | Lanza di Scalea et al. | |
| 2018/0165532 A1* | 6/2018 | Menon Gopalakrishna | B61L 15/0072 |

OTHER PUBLICATIONS

Abdulqader, A.H. "Product qualification and performance assessment of HSRM prestressed concrete railroad ties through laboratory testing" *U. S. Carolina* (2017) pp. 1-107.

Alers, et al. "Ch. 8D: Use of surface skimming SH waves to measure thermal and residual stresses in installed railroad tracks" *Rev. Prog. Quant. Nondestr. Eval.* 9A Springer (1990) pp. 1757-1764.

Arts, T.M. "Measuring the neutral temperature in railway track during installation and use" *Delft U. Techn.* (2011).

Bartelmo, et al. "Digital Image Correlation Techniques for Prestressed Concrete Tie Quality Control" *Proc. Joint Rail Conf.* JRC2016-5842 (2016) pp. 1-6.

Berfield, et al. "Thermal strain measurement in sol-gel lead zirconate titanate thin films" *J. Appl. Phys.* 106:123501 (2009) pp. 1-7.

Chinowsky, et al. "Impacts of climate change on operation of the US rail network" *Transp. Pol.* 75 (2019) pp. 183-191.

Damljnaović, et al. "Laser vibrometry technique for measurement of contained stress in railroad rail" *J. Sound Vib.* 282 (2005) pp. 341-366.

De Strycker, et al. "Validation of Welding Simulations Using Thermal Strains Measured with DIC" *Appl. Mech. Mater.* 70 (2011) pp. 129-134.

Ford, et al. "Simulating impacts of extreme weather events on urban transport infrastructure in the UK" *Int'l Symp. Next Gen. Infra.* (2015) pp. 233-238.

Hauk, V. "Ch. 2: X-ray diffraction" *Struct. Res. Stress Anal. Nondestr. Methods* Elsevier Science (1997) pp. 17-65.

Helm, et al. "Improved 3-D Image Correlation for Surface Displacement Measurement" *Opt. Eng.* 35 (1996) pp. 1911-1920.

Hurlebaus, S. "Safety IDEA Project 15: Determination of longitudinal stress in rails" *Transport. Res. Board* (2011) pp. 1-58.

Jin, et al. "Thermal Stress Measurement of a Double Ring Structure Using Digital Image Correlation Method" *Exper. Tech.* (2013) pp. 1-11.

Johnson, E. "Measurement of forces and neutral temperatures in railway rails—An introductory study" *Swed. Nat'l Test. Res. Inst.* SP Report 2004:11 (2004) pp. 1-70.

Kelly, P. "Solid Mechanics Book" *U. of Auckland* (2015).

Kim, et al. "Noncontact mobile sensing for absolute stress in rail using photoluminescence piezospectroscopy" *Struct. Hlth Monit.* 17 (2018) pp. 1213-1224.

Kish, A. "Best Practice Guidelines for CWR Neutral Temperature Management" *Proc. AREMA Ann. Conf.* (2013).

Kish, et al. "Track Buckling Prevention: Theory Safety Concepts and Applications" *US Dept. Transp.* DOT/FRA/ORD-13/16 (2013) pp. 1-168.

Kjell, et al. "Measuring axial forces in rail by forced vibrations: experiences from a full scale laboratory experiment" *Proc. Inst. Mech. Eng. F* 223 (2009) pp. 241-254.

Knopf, et al. "A Stereovision System for Rail Neutral Temperature Measurements and Effects of the Heating Method" *Proc. Joint Rail Conf.* JRC2020-8119 (2020) pp. 1-5.

Knopf, et al. "A Non-Contacting System for Rail Neutral Temperature and Stress Measurements: Concept Development" *Struct. Hlth. Monit.* 00 (2020) pp. 1-17.

Knopf, K. "A Non-Contacting System for Rail Neutral Temperature and Stress Measurements" *U. S. Carolina* (2019) pp. 1-184.

Liu, et al. "Analysis of U.S. freight-train derailment severity using zero-truncated negative binomial regression and quantile regression" *Accid. Anal. Prev.* 59 (2013) pp. 87-93.

Luo, et al. "Application of Stereo Vision to 3-D Deformation Analysis in Fracture Experiments" *Opt. Eng.* 33 (1994) pp. 981-990.

Luo, et al. "Accurate Measurement of Three-Dimensional Deformations in Deformable and Rigid Bodies Using Computer Vision" *Exp. Mech.* 33 (1993) pp. 123-133.

Murray, et al. "Measurement of vertical and longitudinal rail displacements using digital image correlation" *Can. Geotech. J.* 52 (2014) pp. 141-155.

Nasrollahi, et al. "Numerical Analysis and Experimental Validation of a Nondestructive Evaluation Method to Measure Stress in Rails" *J. Nondestr. Eval. Diag. Progn. Eng. Sys.* 2:031002 (2019) pp. 1-12.

Nucera, et al. "System for in situ measurement of neutral temperature in continuous-welded rail" *Transport. Res. Rec.* 2374 (2013) pp. 154-161.

Orak, et al. "Non-Contact Smartphone-Based Monitoring of Thermally Stressed Structures" *Sensors* 18:1250 (2018) pp. 1-15.

Peters, et al. "Application of Digital Correlation Methods to Rigid Body Mechanics" *Opt. Eng.* 22 (1983) pp. 738-743.

Phillips, et al. "The influence of stress on electro-mechanical impedance measurements in rail steel" *Mater. Eval.* 70 (2012) pp. 1213-1218.

Rajan, et al. "A stereovision deformation measurement system for transfer length estimates in prestressed concrete" *Exp. Mech.* 58 (2018) pp. 1035-1048.

Sutton, et al. "Recent Progress in Digital Image Correlation: Background and Developments since the 2013 WM Murray Lecture" *Exp. Mech.* 57 (2017) pp. 1-30.

Sutton, M.A. "Computer Vision-Based Noncontacting Deformation Measurements in Mechanics: A Generational Transformation" *Appl. Mech. Rev.* 65 (2013) pp. 1-23.

Sutton, et al. "Image Correlation for Shape, Motion and Deformation Measurements" *Springer* (2009) pp. 1-330.

Sutton, et al. "The effect of out-of-plan motion on 2D and 3D digital image correlation measurements" *Opt. Laser Eng.* 46 (2008) pp. 746-757.

Synnergren, et al. "A stereoscopic digital speckle photography system for 3-D displacement field measurements" *Opt. Laser Eng.* 31 (1999) pp. 425-443.

Szelazek, J. "Monitoring of thermal stresses in continuously welded rails with ultrasonic technique" *NDTnet* 3 (1998) pp. 1-9.

Timoshenko, et al. "Stresses in railroad tracks" *Trans. ASME* 54 (1932) pp. 277-302.

Tiwari, et al. "Assessment of High Speed Imaging Systems for 2D and 3D Deformation Measurements: Methodology Development and Validation" *Exp. Mech.* 47 (2007) pp. 561-579.

Wegner, A. "Prevention of Track Buckling and Rail Fracture by Non-destructive Testing of the Neutral Temperature in cw-Rails" *Proc. Int'l Hvy. Haul Conf.* (IHHA) (2007) pp. 557-564.

Zeitouni, et al. "Benefits of high strength reduced modulus (HSRM) concrete railroad ties under center binding support conditions" *Constr. Bldg. Mater.* 192 (2018) pp. 210-223.

Zhu, et al. "Thermal stress measurement in continuous welded rails using the hole-drilling method" *Exp. Mech.* 57 (2017) pp. 165-178.

(56) References Cited

OTHER PUBLICATIONS

Zhu, et al. "Sensitivity of axial stress of electro-mechanical impedance measurements" *Exp. Mech.* 56 (2016) pp. 1599-1610.
Zhu, et al. "Finite Element Analysis of the Effects of Bolt Condition on Bolted Rail Joint Stresses" *J. Transp. Res. Board* 2545 (2016) pp. 36-45.
ISA. "International Search Report and Written Opinion" Int'l Searching Auth. PCT/US19/26267 (dated Jul. 3, 2019) pp. 1-5.
Orak, et al. "Non-Contact Smartphone-Based Monitoring of Thermally Stressed Structures" *Sensors* 18 (2018) pp. 1-15.
EPO. "Extended European Search Report" 19796009.9 (dated Dec. 22, 2021) pp. 1-9.

* cited by examiner

| Uniform Heating | | Top Heating | | Web Heating | |
|---|---|---|---|---|---|
| $k$ ($in^{-1}$) | $T$ (°F) | $k$ ($in^{-1}$) | $T$ (°F) | $k$ ($in^{-1}$) | $T$ (°F) |
| -5.5E-07 | 10.6 | -3.2E-10 | 12.5 | -9.8E-07 | 12.0 |
| -1.1E-06 | 21.2 | -1.6E-09 | 18.6 | -1.5E-06 | 20.1 |
| RNT = 0.3°F | | RNT = 11.0°F | | RNT = -2.4°F | |

Figure 12

| Uniform Heating | | Top Heating | | Web Heating | |
|---|---|---|---|---|---|
| $\varepsilon_y$ ($\mu\varepsilon$) | $T$ (°F) | $\varepsilon_y$ ($\mu\varepsilon$) | $T$ (°F) | $\varepsilon_y$ ($\mu\varepsilon$) | $T$ (°F) |
| 251.7 | 28.9 | 265.9 | 30.5 | 319.1 | 36.7 |
| 458.6 | 52.7 | 651.6 | 74.8 | 612.9 | 70.5 |
| $\Delta T/\Delta\varepsilon_y$ = 0.114909 | | $\Delta T/\Delta\varepsilon_y$ = 0.114855 | | $\Delta T/\Delta\varepsilon_y$ = 0.114905 | |

Figure 13

| | Heating Method | | |
|---|---|---|---|
| | Uniform | Web | Top |
| RNT | 0.3 | -2.4 | 11 |
| $\Delta T/\Delta\varepsilon_y$ | 0.114909 | 0.114905 | 0.11485 |
| $\varepsilon_y$ (estimated) | 249.03 | 286.48 | 223.84 |
| $\sigma_x$ (estimated) | -5,555.35 | -6,390.61 | -4,993.44 |
| $\sigma_x$ (simulated) | -5,668.88 | -5,937.05 | -7,121.29 |
| Error (%) | 2% | -7% | 29.9% |

Figure 14

NON-CONTACT METHODS OF RAIL ASSESSMENT FOR A RAILROAD TRACK

PRIORITY INFORMATION

The present application is a 35 U.S.C. § 371(c) national entry of PCT International Application No. PCT/US2019/026267, titled "Non-Contact Methods of Rail Assessment for A Railroad Track," filed on Apr. 8, 2019, which claims priority to U.S. Provisional Patent Application Ser. No. 62/664,520, titled "Non-Contact Methods of Rail Assessment for A Railroad Track," filed on Apr. 30, 2018, the disclosures of which are fully incorporated by reference herein and for all purposes.

STATEMENT REGARDING FEDERALLY SPONSORED RESEARCH OR DEVELOPMENT

This invention was made with government support under Grant No. 693JJ619C000007, awarded by the Federal Railroad Administration. The government has certain rights in the invention.

FIELD OF THE PRESENTLY DISCLOSED SUBJECT MATTER

The present disclosure relates to methods of rail assessment. More specifically, the present disclosure relates to assessing rail using images taken at different times and temperatures. Further, in some instances, the present disclosure relates to non-contact 3D-vision systems and associated methodologies for rail neutral temperature (RNT) measurements.

BACKGROUND OF THE PRESENTLY DISCLOSED SUBJECT MATTER

The presently disclosed subject matter generally relates to rail safety, and more particularly, to improved methods and technology for assessing rail conditions without requiring actual rail contact.

Continuous welded rail (CWR) has become the standard in modern rail construction because it alleviates the well-documented disadvantages of rail joints. The application of continuous welded rail results in very long segments of continuous rail that exhibit significant thermal elongation over time and as ambient conditions change. Ambient conditions that can affect track expansion include factors such as track age and use, ambient temperatures, and exposure to sunlight and other heat sources.

To avoid the use of impractically large thermal expansion joints and limit thermal elongation of the rail, the rail is anchored to ties in the longitudinal direction. Consequently, the rail is exposed to higher thermal stress demands as temperature varies. When a CWR is laid, the rail is free of thermal stresses and the temperature at that time is known as the rail neutral temperature (RNT). As temperatures deviate from the RNT, significant tensile or compressive thermal stresses are introduced in the longitudinal direction that can lead to a variety of problems, including pull-apart and buckling that compromise the integrity of the track and the safety of rail vehicle operation.

Rail stress management practices depend on the knowledge of the total net stress in the rail and the RNT. Current in-situ rail stress measurement techniques are destructive and disruptive of service. A presently disclosed non-contacting, nondestructive methodology is based on stereo vision image acquisition and Digital Image Correlation (DIC) for acquiring the full field shape, deformation, and strain measurements taken during a thermal cycle. The thermal cycle can be natural or induced.

Although the CWR installation procedures control the RNT to preclude buckling under typical seasonal temperature cycles, the RNT in a track segment generally decreases (rarely increases) over time due to factors related to operating conditions, repair, maintenance, track deformations, and shifting of the track structure. A decrease in RNT increases the risk of buckling due to moderate temperature increases. Existing technologies for evaluating rails have deficiencies in terms of their ability to accurately assess track conditions, with some methods requiring taking the track out of service for destructive testing.

Once the rail is installed in the track, thermal deformations in the longitudinal direction are constrained due to CWR. Seasonal temperature cycles cause deviations from the RNT and induce significant tensile or compressive longitudinal stresses making the track susceptible to buckling or rail pull-apart jeopardizing operation safety (Chinowsky, Helman, Gulati, Neumann, & Martinich, 2019). One of the major causes of train derailments is track failure due to thermal deformations (Liu, Qin, Saat, & Barkan, 2013). The RNT therefore should be near the average ambient temperature in the region to minimize extreme temperature deviations from the RNT during seasonal temperature cycles and current CWR installation procedures control the RNT at installation by prestressing the rail before installation. However, the RNT changes over time due to factors related to operating conditions, repair, maintenance, and the associated track deformations and shifting of the track structure (Rizzo & Nasrollahi, 2019). Furthermore, climate changes cause increase in the average ambient temperature and the duration of extreme temperatures (Ford, et al., 2015). Rail stress management practices depend on the knowledge of the total net stress in the rail and the RNT.

Descriptions of some existing technologies for RNT measurements are referenced in the following Table 1:

TABLE 1

| Method | Basic Principles | Disadvantages |
| --- | --- | --- |
| Rail Cutting | Cut rail to release thermal deformations and direct measurement of expansion/contraction | Time consuming Destructive |
| Rail Lifting | A segment of the rail is unclipped and the vertical force required to lift the rail is measured. The resistance correlates with rail force and RNT. | Time consuming Semi-destructive Cannot be used for rail compression |
| Deformation Measurements | Uses strain gage or extensometer data along with rail temperature information to measure rail elongation and establish the part of the | Instrumentation installation Knowledge of thermal strains at time of installation is needed |

TABLE 1-continued

| Method | Basic Principles | Disadvantages |
| --- | --- | --- |
| | temperature influence that is present as stress. | Lack of strain variation during normal use |
| Ultrasonic | Sound velocity in the rail is correlated to the stress state. | Sound velocity in a rail free of thermal stresses is required |
| Piezoelectrics | Elongation of a piezoelectric crystal substrate mounted on the rail is correlated to a delay in the response signal. | Time consuming instrumentation installation<br>Power needed |
| X-Ray | Distance between two atomic planes in a crystal is measured through X-ray diffraction and related to material stresses. | Measures the stresses in a small volume close to the surface<br>Distance data of the atomic planes in various materials at various stress states is needed |
| Magnetic | Application of alternating magnetic field in the rail produces magnetic noise (Barkhausen) due to magnetoelastic interaction in ferromagnetic materials.<br>The noise intensity is correlated to the longitudinal stress field in the rail. | Need measurements from reference material<br>Barkhausen noise distribution depends also on microstructure condition of rail material |

Shortcomings of existing methods for RNT and stress measurements stem from ease of simplicity, practicality, system complexity, accuracy, reliability, cost, and instrumentation demands. (Kish & Samavedam, 2013). Routinely used methods are destructive and disrupt operations (Kim & Yun, 2018), while all methods acquire data through some sort of contact of the equipment/instrumentation with the rail. Furthermore, existing techniques depend on a stress-free reference measurement which may not be available for already installed rail (Kim & Yun, 2018). Some of these technologies exist as commercial products, while others are at a research and development phase. These methods can be grouped with respect to the underlying basic principles as: (i) rail cutting; (ii) rail lifting; (iii) deformation measurements; (iv) ultrasonic; (v) piezoelectric; (vi) x-ray; (vii) magnetics; (viii) vibro-elastics. Techniques (i)-(iii) have limited acceptance due to the destructive and disruptive nature. The remaining techniques were proven ineffective except in some laboratory applications (Kish & Samavedam, 2013).

Therefore, there is a need for new technologies that can accurately, reliably, and non-destructively evaluate rails in the field. Also, there is a need for determining the state of stress in a rail at different temperatures, as well as changes of the RNT over time, in a reliable, efficient, and cost-effective manner.

BRIEF SUMMARY OF THE PRESENTLY DISCLOSED SUBJECT MATTER

In general, it is a present object to provide improved rail assessment arrangements, and associated methodology.

Aspects and advantages of embodiments of the present disclosure will be set forth in part in the following description, or may be learned from the description, or may be learned through practice of the embodiments.

Embodiments of the present disclosure include methods of rail evaluation. Images of rail can be taken at various temperatures and analyzed to determine rail neutral temperature (RNT), stresses, strain, and curvature. Various patterns can be applied to or associated with the rail to facilitate the analysis of the rails. The rail analysis can be conducted non-destructively, quickly, inexpensively, and without taking the track out of service.

Considered in other perspectives, the presently disclosed subject matter may include use of a vision system for full field deformation measurements and an associated procedure or methodology to estimate the Rail Neutral Temperature (RNT) and its change over time. It is observed that changes in temperature will induce flexure in the rail. While the rail longitudinal direction experiences thermal stresses, the transverse direction of the rail is relatively stress free. Selected sections of rail may be imaged by a StereoDIC (Digital Image Correlation) system at time intervals within a number of thermal cycles. Full field measurements of strain, deformation, and curvature may be acquired for a segment of the rail at each time. The presently disclosed reference-free approach combines measurements acquired at time intervals within a short period during which temperature is expected to vary (i.e., within a thermal cycle) and then processes them to estimate the Rail Neutral Temperature and its variation over time. The thermal profile on the rail surface may also be recorded along with ambient temperature. First, the difference between the longitudinal and transverse strain at the rail web may be computed for each temperature and the trend of the data will be established through regression analysis. The temperature at which the strain difference minimizes or vanishes is considered the best estimate of the RNT. Subsequently, the change in curvature at the anchor location as a function of temperature will be computed through regression analysis of the measurements. The temperature that minimizes the function is considered another estimate of the RNT. Such change in curvature with temperature is not affected by any pre-existing curvature at the initial measurement. In order to estimate any long-term changes of the RNT, or to investigate any seasonal effects the approach can be repeated and the history of RNT measurements evaluated to such end.

Yet further, presently disclosed subject matter in some embodiments may relate to a non-contacting, reference-free measurement system and procedure that is used to estimate the temperature at which the rail of a railroad track is stress free (Rail Neutral Temperature—RNT), as well as the change of RNT over time. In an exemplary embodiment, the system may be based on 3D vision and associated Digital Image Correlation (StereoDIC) techniques, and is capable of measuring simultaneously shape and curvature, full field deformations and strain, along with the thermal field throughout the region being viewed. The presently disclosed methodology does not require prior knowledge of a reference or baseline measurement.

In some presently disclosed embodiments, practice of the presently disclosed subject matter may eliminate or reduce the need for prior knowledge of thermal strains at time of installation, or any other baseline measurements; may eliminate or reduce the need of applying a permanent pattern on a rail to be monitored since for long-term monitoring to estimate the change of the RNT the pattern can be reapplied as needed; may eliminate or reduce the need for validation because the proposed method can be self-validating since the RNT can be estimated in two distinct approaches; may eliminate or reduce instrumentation installation and costs since the proposed StereoDIC technology usage is a non-contact method (for example, for strain and deformation measurements, the StereoDIC requires only that high contrast patterns be temporarily adhered, engraved, or painted on the rail surface, while curvature and out-of-plane deformation measurements can be also achieved by high contrast patterns projected to the rail surface); may eliminate or reduce errors associated with the typical sensor "drift" for long-term monitoring; and/or may eliminate or reduce (in contrast to strain gages and extensometers that acquire average data at discrete surface locations) data acquisition inefficiencies because StereoDIC technology acquires full field deformations and strains across the entire field of view in the cameras.

Considering other perspectives of the presently disclosed subject matter, the subject measurement system does not require any instrumentation to be attached or be in contact with the rail and the track. Also, full field measurements of the deformation, curvature, strain, and temperature are acquired simultaneously in contrast to multiple conventional instrumentation that acquires average values at discrete points. Further, the presently disclosed approach to estimate the RNT is reference-free since it does not require prior knowledge of the temperature at the time of rail installation or any other baseline information.

One exemplary embodiment of presently disclosed subject matter relates in pertinent part to a method of rail evaluation, comprising capturing rail images at two or more temperatures, and analyzing the rail images.

Another presently disclosed exemplary embodiment relates in pertinent part to a non-contact, reference-free method for estimating Rail Neutral Temperature (RNT) to estimate the temperature at which the rail of a railroad track is stress free. Such method preferably comprises periodically imaging shape and curvature of a railroad track at different times while tracking thermal conditions thereat to determine full field deformations and strain thereof under varying thermal conditions, and analyzing resulting data to determine a minimum strain condition and corresponding temperature to thereby establish an estimate of the RNT.

Some aspects of the presently disclosed subject matter may be based on the observation that the deformation of the CWR rail due to thermal loads is nonuniform compared to free rail, and, during a thermal cycle, it exhibits certain deformation patterns that can be captured by a stereo-vision data acquisition system. The three-dimensional (3D) Digital Image Correlation (StereoDIC) technology disclosed as used per presently disclosed methodology acquires full-field measurements of shape, curvature, deformation, and strain, in a single acquisition.

A typical stereo-vision system used with StereoDIC consists of a pair of cameras, lenses, commercial software for image acquisition and processing, and computer hardware. Such basic arrangement has been developed over the last three decades by researchers (Sutton, Yan, Tiwari, Schreier, & Orteu, 2008).

Some aspects of presently disclosed subject matter may relate in part to the presently disclosed system and methodology that processes the deformation measurements to estimate the RNT and longitudinal stress in the rail. Since the method depends on taking measurements during a natural or induced thermal cycle, this disclosure also considers the effects of different heating methods on the thermal deformations and strain measurements and on the accuracy of RNT and stress estimates.

Additional objects and advantages of the presently disclosed subject matter are set forth in, or will be apparent to, those of ordinary skill in the art from the detailed description herein. Also, it should be further appreciated that modifications and variations to the specifically illustrated, referred, and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF SUMMARY OF THE FIGURES

A full and enabling disclosure of the presently disclosed subject matter, including the best mode thereof, to one of ordinary skill in the art, is set forth more particularly including the specification, and including reference to the accompanying figures in which:

FIG. 12 illustrates a table of RNT estimates based on temperature vs. curvature relationships;

FIG. 13 illustrates a table of slope estimates of temperature vs. strain relationships; and FIG. 14 illustrates a table of effects of heating methods on accuracy of the presently disclosed methodology.

Figure 1A:
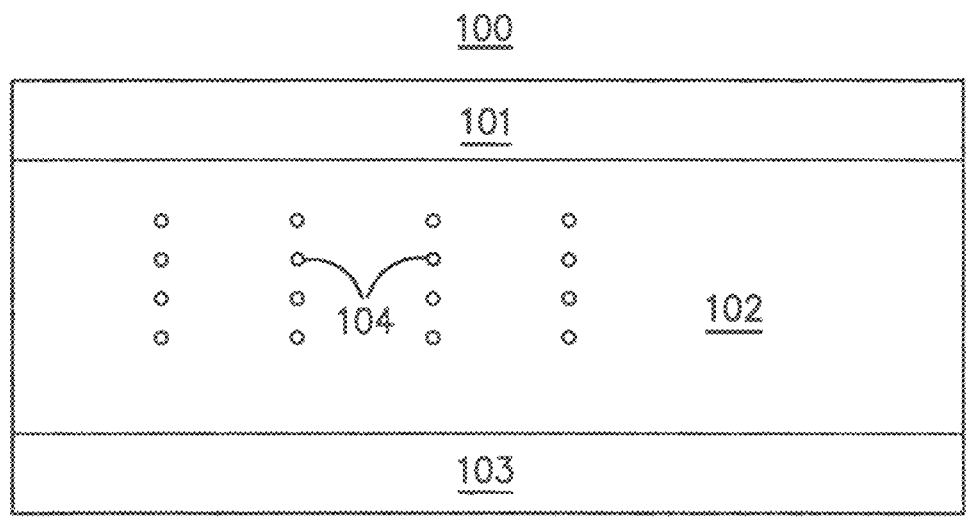
FIG. 1A is a side elevational view of an exemplary rail combined with one exemplary embodiment of presently disclosed subject matter.

Repeat use of reference characters in the present specification and drawings is intended to represent the same or analogous features or elements or steps of the presently disclosed subject matter.

DETAILED DESCRIPTION OF THE PRESENTLY DISCLOSED SUBJECT MATTER

Reference will now be made in detail to various embodiments of the presently disclosed subject matter, one or more examples of which are set forth below. Each embodiment is provided by way of explanation of the subject matter, not limitation thereof. In fact, it will be apparent to those skilled in the art that various modifications and variations may be made in the presently disclosed subject matter without departing from the scope or spirit of the subject matter. For instance, features illustrated or described as part of one embodiment, may be used in another embodiment to yield a still further embodiment, and corresponding and/or associated methodologies may be practiced relative to apparatus disclosed and/or suggested herewith, all of which comprise various embodiments of the presently disclosed subject matter.

Embodiments of the present disclosure include methods of rail evaluation and encompass associated and/or corresponding apparatus. Images of rail can be taken at various temperatures and analyzed to determine rail neutral temperature (RNT), stresses, strain, and curvature. Various patterns can be applied to the rail to facilitate the analysis. The rail analysis can be conducted non-destructively, quickly, inexpensively, and without taking the track out of service.

Methods can include non-contact deformation measurements and procedures for estimating the rail neutral temperature (RNT) in rail segments and the change in RNT over time. Various image capturing systems can be used to collect the images to be analyzed. The image capturing systems can be either stationary or mobile. In some exemplary mobile systems, cameras can be mounted on vehicles that travel on or beside the rail. In other exemplary mobile systems, cameras may be airborne such as by being mounted on drones (UAVs), and in some systems, cameras with combined mounting approaches may be used.

Embodiments can use 3D vision and StereoDIC techniques to measure the shape, curvature, full field deformation and strain, and thermal fields throughout the region of the rail segment being analyzed. Strain measurements of 100με and less and displacements of 10 microns and less can be determined. The evaluation methods can be reference free, meaning data collected during rail installment or repair is unnecessary. The measurements can be acquired over a short period of time while the rail temperature changes. Rail neutral temperature and its fluctuation over time can be determined. Innovations of the present disclosure include evaluation methods that do not require instrumentation to be attached or in contact with the rail.

Embodiments of the present disclosure can provide simple and cost-effective solutions that can be deployed quickly, on a routine basis or on demand, and without disrupting service. Safety of operations can be improved due to timely detection of track instability or rail failure. Track maintenance costs can be reduced because interventions can be prioritized based on current and accurate knowledge of rail conditions. Data produced can be integrated with information acquired by other track testing means to provide a comprehensive understanding and detailed records of the state of rail over time.

Methods of the presently disclosed subject matter can include DIC, which is a unique suite of non-contacting, vision-based full-field measurement methods. The methods can utilize a stereo-vision system with StereoDIC, consisting of a pair of cameras, lenses, and hardware and software for image acquisition and processing.

Accurate measurements in presence of both large rotations and displacements can be assessed. Variable fields of view can be incorporated using different lenses and data can be obtained in near real time (e.g., within ⅟30th of a second). High contrast patterns can be adhered, engraved, or projected on rail surfaces to facilitate measurements and increase accuracy. The high-contrast patterns are durable and can survive harsh environments such as those encountered by rails.

The methods of the presently disclosed subject matter do not necessarily require high-contrast patterns. If a pattern is lost for any reason, measurements can continue to be obtained. For example, three non-collinear markers can be engraved on the rail within the initial patterned image area and their motion recorded. A replacement pattern can also be placed on the rail in the same general region. The spatial position of each point in the new pattern can then be obtained relative to the engraved markers, correlations can be made with the initial pattern, and the history of deformations in the field of view can continue to be measured.

FIG. 1A is an illustration of a rail segment 100 of a railroad track. Methods of the present disclosure can be used to evaluate rails, including the rail head 101, the rail web 102, and the rail foot 103. The methods can include capturing rail 100 images at two or more temperatures and analyzing the rail images. The images can include rail profile images and can form a complete thermal cycle that would be represented by a typical day. That is, images can start being recorded at a first temperature and can continue being recorded until that temperature is reached again. For example, the ambient temperature may begin at a low of 65° F. before sunrise, reach a high of 90° F. during the day, and then return to 65° F. the following morning. Rail temperatures can be even higher or lower than such exemplary ambient range, depending on other factors, such as the amount of direct sunlight exposure. Analyzing one or more full thermal cycles of the rail can allow for a better understanding of rail conditions (e.g., stress, strain, shape, curvature, deformation, etc.) throughout the day.

Figure 1B:
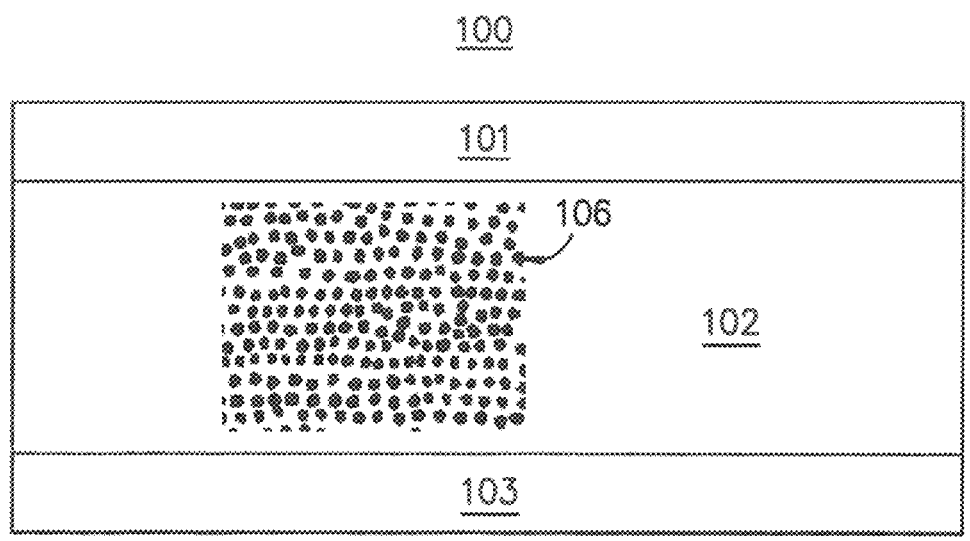
FIG. 1B is a side elevational view of an exemplary rail combined with another exemplary embodiment of presently disclosed subject matter.

In some embodiments, a pattern 104 can be applied to the rail head 101, the rail web 102, and/or the rail foot 103. The pattern 104 can be a speckled pattern, meaning the rail is covered or marked with a large number of small spots or patches of color. Ideally, the pattern 104 should be a high-contrast pattern that facilitates the analysis of how the pattern 104 deforms as temperature changes and/or as time passes. Per presently disclosed subject matter, the pattern used can be random or ordered. FIG. 1A illustrates an ordered pattern 104, where the dots form a matrix of rows and columns. The dots can have an average diameter of from 0.1 mm to 10 mm, such as from 0.3 mm to 8 mm, and such as from 0.5 mm to 5 mm. FIG. 1B is similar to the illustration of FIG. 1A but shows exemplary use of a random pattern 106 of dots.

Instead of dots, other shapes can be used to form the pattern 104 or 106, including squares, triangles, or stripes. The sides of the square/rectangles can have lengths ranging from 0.1 mm to 10 mm, such as from 0.3 mm to 8 mm, and such as from 0.5 mm to 5 mm. Alternatively, the sides can, in some instances, have even greater lengths. Similarly, the stripes can have an average width of from 0.1 mm to 10 mm, such as from 0.3 mm to 8 mm, and such as from 0.5 mm to 5 mm.

The exemplary patterns 104 or 106 can be applied to the track (the rails) using various means. In one embodiment, the pattern 104 or 106 is painted on the track. In a second embodiment, the pattern 104 or 106 is stamped or engraved into the track. In a third embodiment, the pattern 104 or 106 can be applied using an adhesive. The application of the pattern to the rail 100 can be performed during the fabrication of the track or while the track is in service. Still further, in some instances, a pattern 104 or 106 may also be projected (for example, projecting high intensity white light in either pattern 104 or 106 onto the rail surface).

Figure 2:
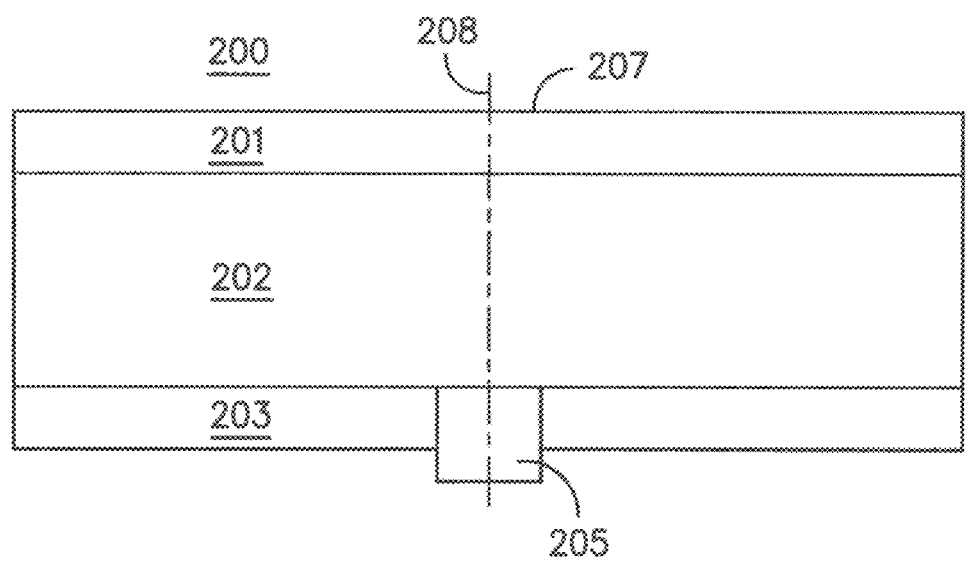
FIG. 2 is a side elevational view of an exemplary rail as may be used with presently disclosed subject matter, and representatively anchored to a rail tie in accordance with presently disclosed subject matter.

FIG. 2 is an illustration of a rail 200 anchored to a rail tie 205. The rail tie 205 anchors the rail 200 and elastically restrains the rail 200 from moving vertically or horizontally. FIG. 2 also illustrates the anchor point vertical axis 208 of the rail, where the rail 200 is stationary. As temperatures rise above the RNT, the rail 200 expands, and both sides of the anchor point vertical axis 208 tend to bow upwards. As temperatures fall below the RNT, the rail 200 tends to contract, and both sides of the anchor point vertical axis 208 tend to bow downwards.

Methods of the presently disclosed subject matter can capture profile images of the rail head 201, the rail web 202, and/or the rail foot 203, and can compute the rail curvature. Based on such curvature determinations, one could, if they were interested, also estimate the incline/decline angle of the rail head 201, the rail web 202, and/or the rail foot 203.

Figure 3:
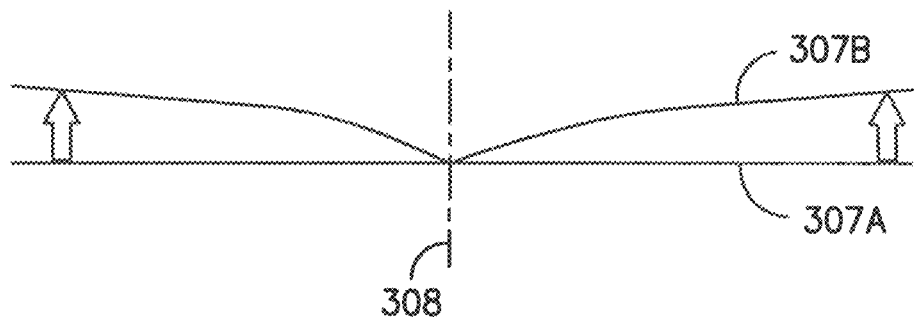
FIG. 3 is a side view exemplary representation of a rail as may be used in accordance with presently disclosed subject matter, and deflecting upwards.

FIG. 3 is an illustration of a rail deflecting upwards about the anchor point vertical axis 308. In one example, the deflection of the top surface (307A/307B) of the railhead is measured. At the RNT, the top surface of the railhead is generally perpendicular to the anchor point vertical axis 308 and is straight (307A). In some instances, it may also be parallel to the horizon, but that's not necessarily the case; for example, the track can be on a slope. When the temperature rises above the RNT, the top surface of the railhead will generally deflect upwards (307B), as indicated by the arrows.

Figure 4:
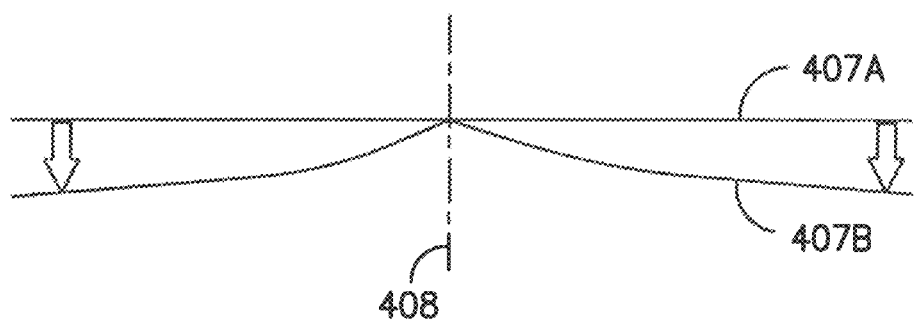
FIG. 4 is a side view exemplary representation of a rail as may be used in accordance with presently disclosed subject matter, and deflecting downwards.

FIG. 4 is an illustration of a rail deflecting downwards about the anchor point vertical axis 408. At the RNT, the top surface of the rail is perpendicular 407A to the anchor point vertical axis 408. As the temperature goes below the RNT, the rail tends to deflect downwards 407B about the anchor point vertical axis 408.

The RNT Measurement Method

The method is based on the observations that when a CWR is subjected to thermal loads, non-uniform deformations appear on the top of the rail, as well as on the observations that the longitudinal strain at the web of the rail between two consecutive ties is negligible, whereas the transverse strain attains it maximum value. In reference to the top of rail deformations, computer simulations have shown that the curvature changes sign as the temperature in the rail passes through the RNT and that the curvature-temperature relation is linear. In reference to the strain field on the surface of the web, computer simulations have shown that the transverse direction is stress free, whereas the longitudinal stress attains its maximum value. The strain-temperature relationship is also linear. The computer simulation studies have been validated with experimental investigations at the component level. Details of the development, verification and validation of the observations are presented in (Knopf, Rizos, Qian, & Sutton, 2019) and (Knopf, A Non-Contacting System for Rail Neutral Temperature and Stress Measurements, M.Sc. Thesis, 2019). The proposed method requires shape and deformation measurements of the top of rail and web to be taken at two distinct temperatures, $T_1$ and $T_2$, within a natural or induced thermal cycle irrespective of the RNT, which is unknown. The processing is performed in two steps. In the first step, the average curvature of the top of the rail, $k_1$ and $k_2$, is computed based on the shape measurements of the top of the rail. The two points $(T_1, k_1)$ and $(T_2, k_2)$ define a line equation where its constant term represents the RNT.

$$T = RNT + [(T_2 - T_1)/(k_2 - k_1)]k \quad (1)$$

It is evident that the proposed method is reference-free. The temperature change of $\Delta T = T_2 - T_1$ causes change, $\Delta \varepsilon y$, in the transverse measured from the baseline temperature $T_1$ which, most likely, is not the RNT. Thus, only the slope of the temperature-strain displacement defined by the two measurements is determined. However, the RNT is computed by Equation (1) and therefore, the temperature-strain relationship is uniquely defined as $$T = RNT + (\Delta T / \Delta \varepsilon y) \varepsilon y \quad (2)$$

Figure 5A:
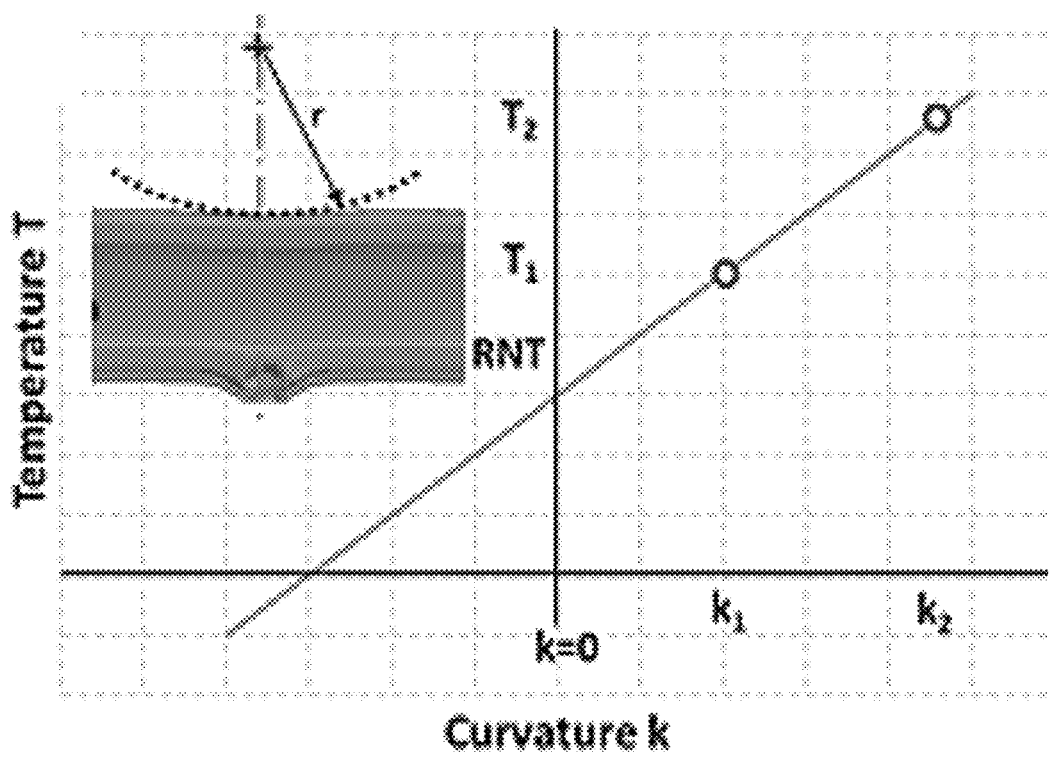
FIGS. 5A and 5B graphically illustrate RNT determination and temperature strain relationship, respectively.
Figure 5B:
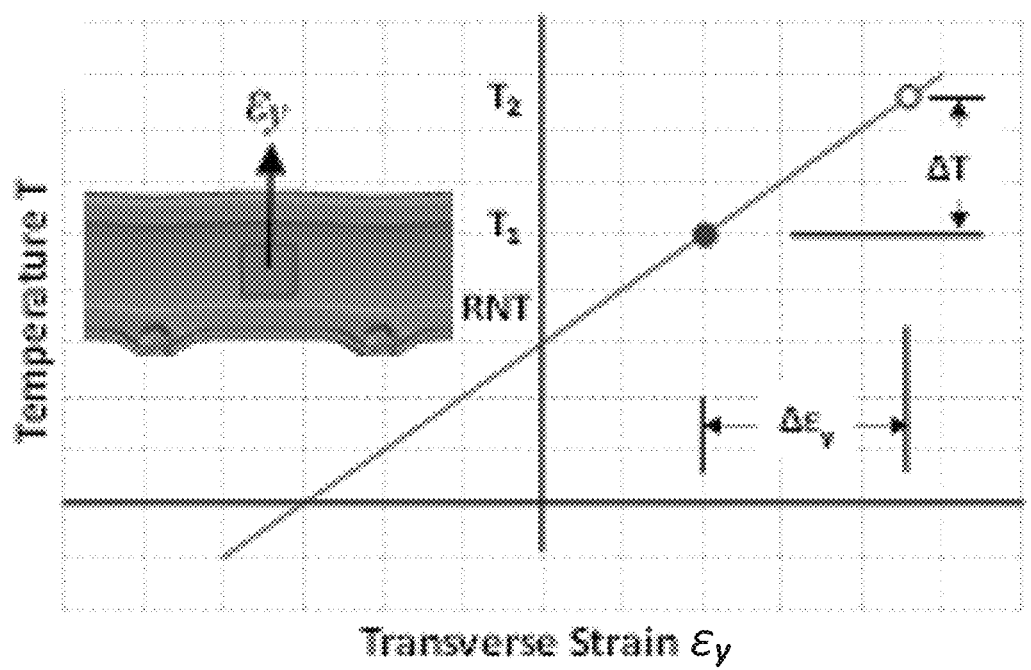

The RNT determination and the temperature strain relationship is shown graphically in FIGS. 5A and 5B. FIGS. 5A and 5B show, respectively, Method Procedure Steps: FIG. 5A, Step 1—Estimate The RNT From Curvature Data Along The Rail Head About The Anchoring Points; FIG. 5B, Step 2—Use The RNT From Step 1 And Acquired Strain Measurements To Establish The Unique Temperature-Strain Relationship.

In the second step the longitudinal stress at a specific temperature is computed based on plane stress conditions as:

$$\varepsilon_x = \frac{\sigma_x}{\varepsilon} - \frac{\nu \sigma_y}{E} + \varepsilon_{x0} \quad (3)$$

-continued $$\varepsilon_y = -\frac{\nu\sigma_x}{E} + \frac{\sigma_y}{E} + \varepsilon_{y0} \quad (4)$$

Assuming, without loss of accuracy, that the transverse stress $\sigma_y$ and the longitudinal strain $\varepsilon_x$ is negligible, and that initial strains are equal to each other and/or equal to zero, i.e., $\varepsilon_{y0}=\varepsilon_{x0}=0$, the longitudinal stress $\sigma_x$, can be computed as: Subtracting $\varepsilon_x$ from $\varepsilon_y$ and $$\sigma_x = -\varepsilon_y \frac{E}{(1+\nu)} \quad (5)$$

And thus, the longitudinal stress can be estimated using Equation (5) at any rail temperature.

EXAMPLES

Computer simulations of methods of the present disclosure were conducted and used to replicate the data that would be collected by a StereoDIC system. To this end, a Finite Element Model (FEM) of a steel rail was developed in ABAQUS™. The simulation included a rail anchored at its base to every other rail tie. Thermal loading was applied, ranging from −100° F. to 100° F., and 0° F. was chosen as an arbitrary RNT.

Two major observations were made that can be adopted by the methods of the present disclosure—the measurement of curvature fields and strain fields. Due to the non-uniform distribution of steel mass in the cross section of a rail and the eccentricity of the constraints imposed by the rail anchors, it was expected that thermal loads would cause flexure in the rail in proportion to the thermal load.

Figure 6:
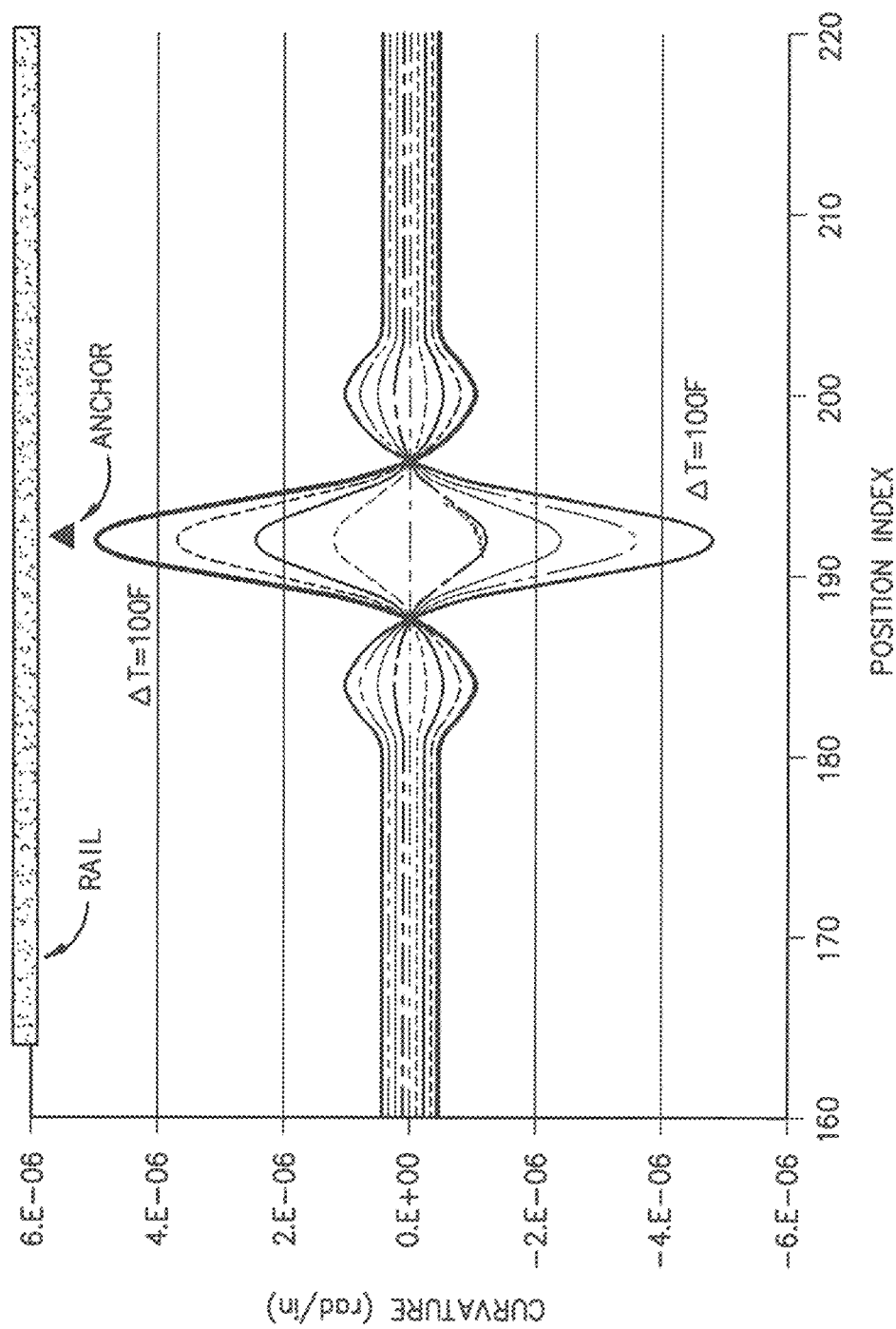
FIG. 6 is an exemplary computer simulated graph, in accordance with presently disclosed subject matter, of rail curvature as a function of temperature.

FIG. 6 is a graph of rail curvature at simulated temperatures of −100° F., −75° F., −50° F., −25° F., 0° F., 25° F., 50° F., 75° F., and 100° F. The flexure is strongly evidenced in the rail head in the vicinity of the anchors, as well as at the flanges of the base. The curvature of a rail segment between two successive anchors is shown to be generally small. As the temperature transitions from above RNT to below RNT, the measured curvatures change sign. At the RNT, the rails are straight. The computed deformations are in the range of 200-1000 microns and are well above the lower limit of the measurements of the methods of the present disclosure, which can incorporate a StereoDIC system.

Figure 7:
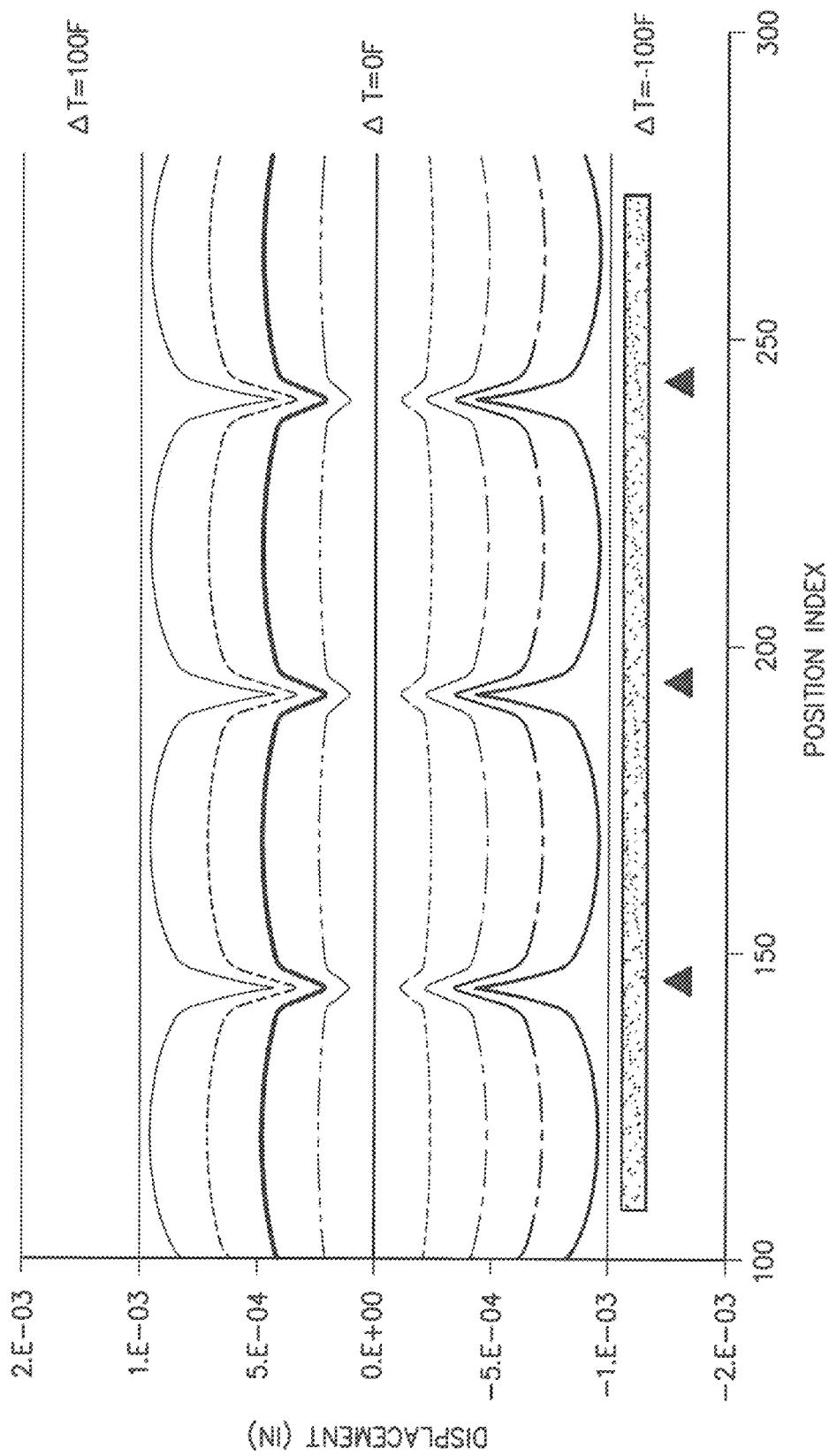
FIG. 7 is an exemplary computer simulated graph, in accordance with presently disclosed subject matter, of rail base flange deformation as a function of temperature.

At a cross-section between two successive anchors, the web of the rail remained generally stress free in the transverse direction (base to head). At the same section, the strain in the same direction is predominantly due to the thermal load. In the longitudinal direction, however, the model showed different values of strain while the normal stress was no longer zero since the rail is not free to expand at the same rate as in the transverse direction. It was also observed that the difference between the longitudinal and the transverse strain attains a minimum value, or vanishes, at the RNT. FIG. 7 is an exemplary computer simulated graph, in accordance with presently disclosed subject matter, of rail base flange deformation as a function of temperature. It is noted that the computed strains in both directions are in the range of 250-1,000 pc and are well above the lower limit on accuracy of a typical StereoDIC system.

Figure 8:
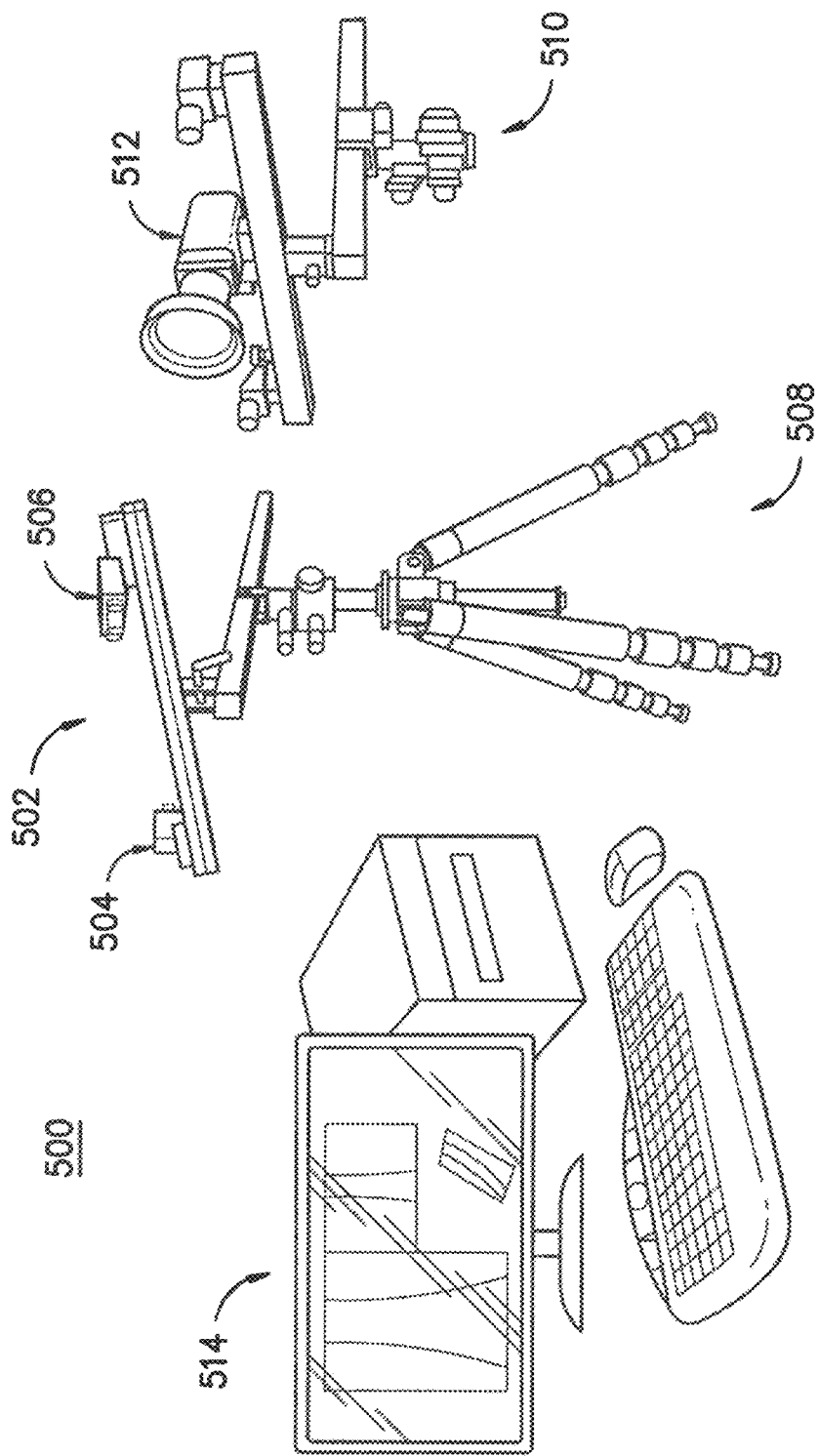
FIG. 8 is a schematic/pictorial representation of an exemplary arrangement of a StereoDIC system as may be implemented in accordance with presently disclosed subject matter, for use with rail evaluation patterns, such as represented in present FIG. 1.

FIG. 8 is a schematic/pictorial representation of an exemplary arrangement of a StereoDIC system as may be implemented in accordance with presently disclosed subject matter, for use with rail evaluation patterns, such as represented in present FIGS. 1A and 1B.

DIC, as applied per the presently disclosed subject matter, is a non-contacting, vision-based, full field measurement methodology, represented at least in part by the exemplary hardware of present FIG. 8. Per the exemplary arrangement illustrated, the subject stereo-vision system generally 500 used with StereoDIC includes a mount generally 502 for supporting a pair of cameras and lenses 504 and 506. In the exemplary arrangement represented, mount 502 is received on a tripod 508 to represent an established position, but as understood from the complete disclosure herewith, such mount 502 may be associated with a moving or movable or airborne arrangement for imaging patterns on or associated with various rail segments. Mount 510 shows such paired (stereo) cameras received in combination with a thermal camera generally 512. Of course, such thermal camera 512 may be omitted in certain embodiments, as represented by the mount 502 arrangement. Cameras are mounted on appropriate platforms depending on the specifics of a given application.

Correlated Solutions Inc. is an example of a US company known to develop and manufacture stereo image correlation photogrammetry software and hardware systems. Such a system may include a hardware arrangement generally 514 involving such as a computer, monitor, keyboard, and mouse (not respectively marked). Such company has provided, for example, commercial software referenced as Vic-Snap 8 and Vic-3D™ which would be useful for image acquisition and processing, respectively, with appropriate computer hardware, a standard system arrangement of which, configured for fixed location testing, is illustrated by FIG. 8.

Such a system arrangement represents that the use of stereo-vision systems in the presently disclosed subject matter, advantageously provide: (i) noncontacting features, (ii) which are full-field (3D), (iii) capable of accurate measurements of strains as small as 100με and displacements as small as 10 microns, (iv) for accurate measurements in presence of both large rotations and displacements, (v) and for variable field of view using different lenses. Using the herein-referenced commercial software to perform post-imaging analysis, provides the potential to obtain data in near real time (⅓₀th of a second).

As will be understood by those of ordinary skill in the art from the complete disclosure herewith, the presently disclosed subject matter achieves the ability to estimate the RNT based on such imaging observations. For example, once the rail is imaged by such an exemplary StereoDIC system (preferably at time intervals within a short period during which temperature is expected to vary, e.g. every 4 hours over a 24-hour cycle), full field measurements of strain, deformation, and curvature are acquired for a segment of the rail at each time. In some instances, the thermal profile on the rail surface will also be recorded along with ambient temperature. Initially, the difference between the longitudinal and transverse strain at the rail web will be computed for each temperature and the trend of the data will be established through regression analysis. The temperature at which the strain difference minimizes or vanishes is considered the best estimate of the RNT. Subsequently, the change in curvature at the anchor location as a function of temperature will be computed through regression analysis of the measurements. The temperature that minimizes the function is considered another estimate of the RNT. It is noted that the change in curvature with temperature is not affected by any pre-existing curvature at the initial measurement. In order to estimate any long-term changes of the RNT, or to investigate any seasonal effects, such methodology may be repeated and then the history of RNT measurements evaluated. Furthermore, if the original high definition pattern has deteriorated for any reason, a fresh pattern can be applied every time the measurements are taken without affecting accuracy.

Computer Models for Simulations

Figure 9:
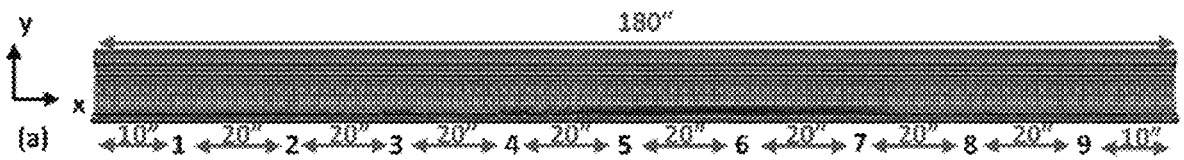
FIG. 9 illustrates an FE model track configuration simulating a testing track with tie support locations labeled in black.

The proposed method requires measurements to be taken at two temperatures during a natural or induced thermal cycle. Natural thermal cycle occurs, for example, due to the sun effects in a 24-hour period. In such cases, in-situ thermal scanning of the rail shows an approximately uniform temperature field on the rail. An induced thermal cycle can be generated through heating of parts of the rail. In this study, heating strips are used in two different ways by placing the strips on top of the rail or attaching the strips on the web. The computer simulations in this section consider three different ways of applying the thermal loads on a CWR segment to provide insight on the effectiveness and accuracy of the RNT and stress measurements. To this end, thermoelastic models for Finite Element Analysis (FEA) are developed in commercial software ABAQUS™. Deformations due to temperature changes are computed at the areas of interest, i.e., the top of the rail and the web area between ties. These models are consistent with the Rail Track Testing facility in the Railway Infrastructure Laboratory at USC. This testing bed is comprised of a 180-inch 132 RE physical rail segment with 9 concrete ties spaced at 20" center-on-center, as depicted in FIG. 9. Such FIG. 9 illustrates an FE model track configuration simulating a testing track with tie support locations labeled in black.

Model Components and Materials

The model for FEA consists of the rail and the tie plate. The effects of the ties and ballast are considered elastic support boundary conditions to the rail. The rail itself is the 132 RE rail shape and is extruded to a 180 in. total length. The rail is considered a 3D deformable solid discretized into 35,640 C3D8RT linear hexahedral elements. The 6"×8.5" tie plate represents the rail-tie interface, is assumed a rigid 3D shell with its reference point located at the center of the tie plate. Tie plates are located at each of the tie support locations 1 through 9, shown in FIG. 9. Only the rail is subjected to the thermal loading. The Elastic modulus of steel is assumed E=29,000 ksi, with Poisson's ratio v=0.3 and density $\rho=730\times10^{-6}$ (lbf*s²/in⁴). The thermal properties of steel are taken as: coefficient of thermal expansion $\alpha=6.7\times10^{-6}$ (in/in/° F.); the specific heat c=0.122 (Btu/(lb-° F.)); and the conductivity $\lambda=7.18\times10^{-4}$(Btu/s*° F.*in).

Boundary and Initial Conditions

The boundary conditions pertain to both prescribed displacements, initial temperature and heat flux. The rail end faces are constrained in the longitudinal direction to simulate the constraints imposed by the CWR Rotations are also fully constrained, yet the rail is still free to deform in the plane of its cross-section. The tie plate is constrained in its own plane and elastically supported for the out-of-plane motion simulating, this, the elastic support provided by the ties and ballast. The elastic supports are simulated by springs with their stiffness defined as a function of the tie spacing, $S_{tie}$, and the General Track Modulus, $K_{track}$ as (Timoshenko & Langer, 1932):

$$K_s = K_{track} S_{tie} \qquad (6)$$

For the assumed General Track Modulus of 4 ksi, the stiffness is computed as $K_s$=80,000 lb/in and is evenly distributed evenly among nine springs in a rectangular grid arrangement. The rail-tie plate connection assumes that the horizontal force generated at the rail-tie plate interface remains less than friction. A tie constraint is used to couple all degrees of freedom between this interface. The initial temperature represents the simulated RNT and, without loss of generality, is set arbitrarily to T0=0° F. Initially the heat flux is set to $q_0$=0, since the rail is not thermally loaded initially.

Thermal Loading Simulations

Model Simulation Description

The rail is thermally loaded by defining a surface heat flux to different areas along the rail. In the laboratory tests, heating strips are used to thermally induce rail expansion. This is simulated by applying a 1" wide surface heat flux which spans the entire rail. This study investigates applying heating strips along the center line of the top of the rail or along the rail web. A natural occurring thermal loading by the sun is also considered by applying a uniform surface heat flux to the entire outer rail surface except for the rail ends or bottom surface. This study considers uniform, top of rail, and rail web heating, denoted respectively as "Uniform", "Top" and "Web." Varying magnitudes of heat flux are used to force a rail head and rail web temperature of approximately 53° F. and 120° F., respectively.

Rail Head Vertical Deformation Results

Figure 10:
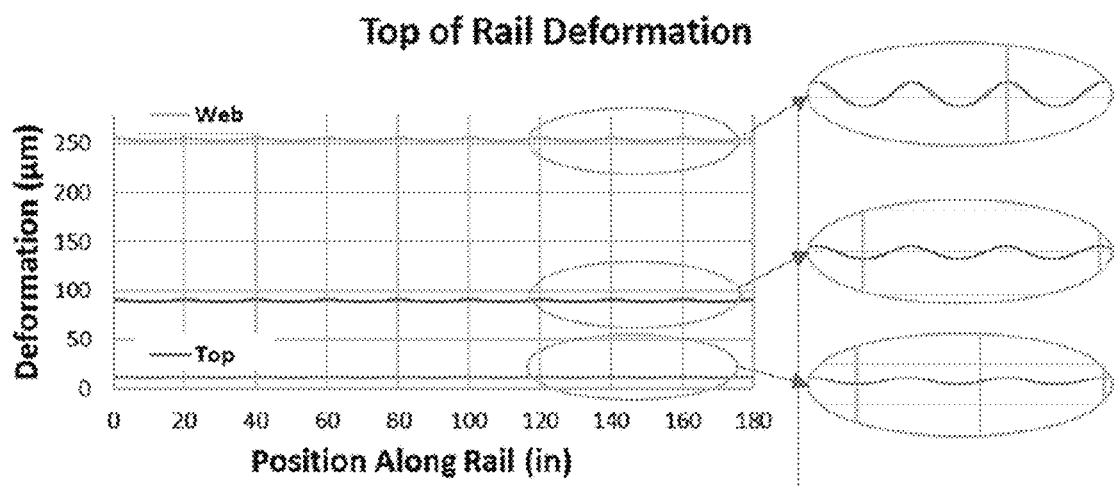
FIG. 10 graphically illustrates a plot of the rail head vertical deformed shape profiles at a rail head temperature of 53° F. to compare different heating surface area methods.

Top of rail deformation measurements are extracted along the center line of the top of rail over the entire 180-inch rail span and as shown in FIG. 10, which graphically illustrates a plot of the rail head vertical deformed shape profiles at a rail head temperature of 53° F. to compare different heating surface area methods. It is observed that the "Web" heating produces the highest deformations. This is because this heating strip is applied to the thinnest section of the rail. Therefore, a smaller volume of the rail is required to heat up before inevitably pushing the rail head up. In contrast, the other heating surface area methods are applied to thicker sections of the rail, yielding smaller vertical shape deformations.

Rail Web Strain Results

Figure 11:
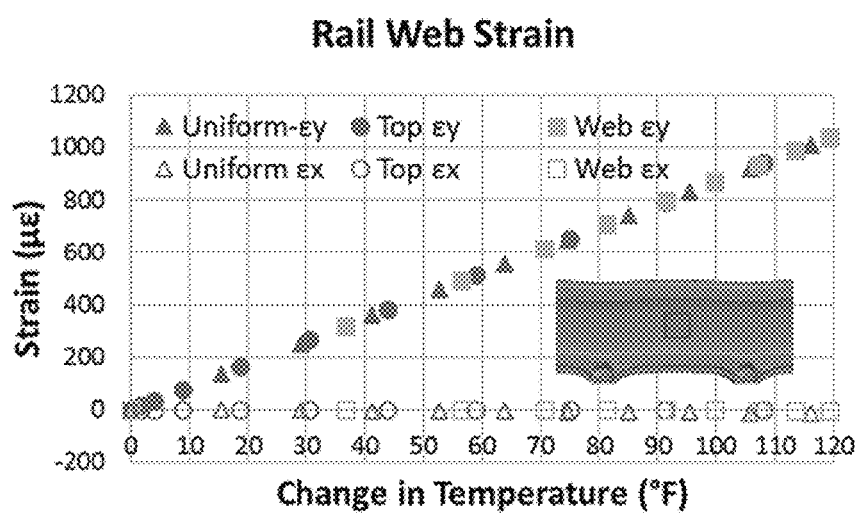
FIG. 11 graphically illustrates plots of the longitudinal, $\varepsilon_x$, and transverse, $\varepsilon_y$, strains with respect to temperature change to investigate the effects of the heating surface area method.

Rail web thermal strain measurements are extracted from an element shown in the inset of FIG. 11, which graphically illustrates plots of the longitudinal, Ex, and transverse, $\varepsilon_y$, strains with respect to temperature change to investigate the effects of the heating surface area method. This element is located at the centroidal height of the rail cross section, 3.2" from the bottom surface of the rail, and between the 4th and 5th tie location, 80" from one end of the rail. FIG. 11, in fact, displays the transverse and longitudinal strain with respect to temperature change. It is observed that the transverse strain of all models increases linearly with temperature change at the same rate for the three different heating methods. This confirms that at this location, the transverse strain is not affected by the heating surface area method. In contrast, the longitudinal strain of all models is negligible for all rail temperatures and can be considered zero relative to the transverse strain. This is expected due to the imposed constrains which constrain the rail from expanding longitudinally, while vertically, at this location the rail can freely deform. This reaffirms the fundamental hypotheses of the proposed method.

Effects of Thermal Loading Method on RNT and Stress Measurements

In this section, the effects of the heating methods on the RNT and stress measurements are investigated. To this end, two temperatures are selected for each heating method and the average curvature between two ties is computed from the simulated deformations as discussed in (Knopf, Rizos, Qian, & Sutton, 2019). The temperature-curvature linear relationship depicted in FIG. 8(a) yields the RNT estimates shown in the Table of FIG. 12. In view of the simulated RNT=0° F., it is concluded that the natural thermal cycle produces the closest estimate, while, of the induced cycle, the web heating is within 2.5° F. of the simulated value. Heating of the top of the rail in an induced thermal cycle is not recommended because of the high error and the small deformations it produces; see FIG. 10.

The slope $\Delta T/\Delta\varepsilon_y$ of the temperature v. strain relationship in Equation (2) is computed by selecting two temperatures and the corresponding transverse strain from the simulated measurements for each heating method and is listed in the Table of FIG. 13.

With the estimates of the RNT and the slope $\Delta T/\Delta\varepsilon_y$, Equation (2) can be solved for the transverse strain if the rail temperature T is measured. Finally, the longitudinal stress in the rail can be estimated. It is evident that the "Uniform" and "Web" heating produce the most accurate results, while the top of rail heating should be avoided. FIG. 14 illustrates a table of effects of heating methods on accuracy of the presently disclosed methodology.

CONCLUSIONS

The proposed work introduced a non-contacting, reference-free measurement system for measuring the Rail Neutral Temperature and estimating the longitudinal stress in the rail. It focuses on the effects of different heating methods for the design and procedure of a full-scale prototype. The proposed system presents significant advantages over existing RNT measurement technologies: (i) It is a reference-free method; (ii) Eliminates instrumentation installation with corresponding costs since the proposed StereoDIC does not have equipment-to-contact demand; and (iii) With long term monitoring, it eliminates errors associated with the typical sensor "drift." In addition, the proposed system represents a simple-to-adopt and cost-effective technology that has the ability to improve the overall safety of rail operations due to its timely detection of imminent track instabilities and rail failure. The method acquires data during a natural or induced thermal cycle. The accuracy of the method is affected by the way the thermal cycle takes place. Uniform heating or heating the web of the rail produces the most reliable measurements and estimates, as demonstrated through computer simulations. While the web strain measurements are not affected by the heating method the error is estimating RNT when the top of rail is heated increases. Furthermore, measurements obtained by heating the top of the rail lead to significant error in the stress estimates. It is concluded that measurements should be taken either during a natural thermal cycle or, if an induced thermal cycle is selected, the heat should be applied at the web of the rail.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of rail evaluation, comprising:
   using at least one camera for capturing rail camera images at two or more temperatures, with the rail camera images captured relative to at least one fixed physical reference comprising a rail anchor;
   analyzing the rail camera images including determining changes in at least portions of the rail relative to the fixed physical reference and determining a rail neutral temperature (RNT); and
   periodically repeating said capturing and analyzing steps consecutively and estimating changes over time in rail neutral temperature (RNT) of a railroad track being monitored.

2. The method of rail evaluation of claim 1, wherein the rail camera images include rail web images.

3. The method of rail evaluation of claim 1, wherein the rail camera images include rail profile images.

4. The method of rail evaluation of claim 1, wherein the rail camera images are captured between rail anchors.

5. The method of rail evaluation of claim 1, wherein the rail camera images are captured at rail anchor points.

6. The method of rail evaluation of claim 1, further comprising associating a pattern with the rail, and imaging such pattern.

7. The method of rail evaluation of claim 6, wherein the pattern includes a dot pattern.

8. The method of rail evaluation of claim 7, wherein the pattern includes an ordered matrix of dots.

9. The method of rail evaluation of claim 7, wherein the pattern includes a random collection of dots.

10. The method of rail evaluation of claim 7, wherein the pattern includes dots having an average diameter of at least 0.1 mm.

11. The method of rail evaluation of claim 7, wherein the pattern includes dots having an average diameter of from 1 mm to 10 mm.

12. The method of rail evaluation of claim 6, wherein the pattern includes a striped pattern.

13. The method of rail evaluation of claim 6, wherein the striped pattern includes stripes having a width ranging from 0.1 to 2 mm.

14. The method of rail evaluation of claim 12, wherein the striped pattern includes stripes having a width ranging from 2 to 10 mm.

15. The method of rail evaluation of claim 6, wherein the pattern is at least in part one of stamped, painted, and engraved on the rail.

16. The method of rail evaluation of claim 6, wherein the pattern is at least in part applied using one of an adhesive and a projection.

17. The method of rail evaluation of claim 1, wherein analyzing the rail camera images includes determining one or more of shape, curvature, strain, and deformation of the rail.

18. The method of rail evaluation of claim 1, wherein analyzing the rail camera images includes determining one or more of shape, curvature, strain, and deformation of the rail for at least one of multiple different temperatures and at multiple points in time.

19. The method of rail evaluation of claim 1, wherein the rail camera images include at least full thermal cycle.

20. The method of rail evaluation of claim 1, further comprising measuring at least one of rail temperature and ambient temperature at the time of capturing rail camera images.

21. The method of rail evaluation of claim 1, further comprising measuring rail temperature at at least two locations.

22. The method of rail evaluation of claim 1, wherein said capturing railway track images step comprises image acquisition from at least one of a stationary, mobile, and airborne platforms.

23. A non-contact, reference-free method for estimating Rail Neutral Temperature (RNT) to estimate the temperature at which the rail of a railroad track is stress free, comprising:
using at least one camera for periodically imaging shape and curvature of a railroad track at different times realtive to at least one fixed physical reference comprising a rail anchor while tracking thermal conditions thereat to determing full field deformations of the railroad track and strain thereof under varying thermal conditions;
analyzing resulting data to determine a minimum strain condition and corresponding temperature, said analyzing including computing through regression analysis of the measurements change in curvature of the track rail at the location of the at least one fixed physical reference as a function of temperature, to determine a temperature that minimizes the function to thereby establish an estimate of the RNT; and
periodically repeating said imaging and analyzing steps consecutively and estimating changes over time in RNT of a railroad track being monitored.

24. A method as in claim 23, wherein said analyzing includes computing difference between the longitudinal and transverse strain at the rail web for each temperature, and establishing trend of the data through regression analysis, to determine the temperature at which the strain difference minimizes.

25. A method as in claim 23, further including marking segments of a railroad track with a tracking pattern, to facilitate imaging thereof.

26. A method as in claim 25, wherein said periodically imaging includes use of 3D vision and Digital Image Correlation (StereoDIC) techniques to enable multiple simultaneous measurements along with thermal field data throughout a track rail region being viewed.

* * * * *